Feb. 7, 1967  J. A. ÅKESSON  3,303,457
POSITION INDICATOR
Filed Oct. 21, 1964

United States Patent Office 3,303,457
Patented Feb. 7, 1967

3,303,457
POSITION INDICATOR
Jan Assar Åkesson, Sollentuna, Sweden, assignor to Aktiebolaget Atomenergi, Stockholm, Sweden, a company of Sweden
Filed Oct. 21, 1964, Ser. No. 405,500
Claims priority, application Sweden, Oct. 22, 1963, 11,583/63
5 Claims. (Cl. 340—1)

The invention relates to a device for indicating the position of an object by means of ultra-sound, and particularly for indicating the position of the control rods in a nuclear reactor.

A known type of position indicator in nuclear reactors uses relays which consist of two springy members of a magnetic material, enclosed in a glass tube containing a protective gas, said springy members having contact plates of gold or platinum-rhodium, for instance. By arranging several such indicators in a row and providing a permanent magnet on the control rod, the position of the control rod can be indicated step by step, as the relays will close while the magnet is passing by. It is an inconvenience of this device that the relays and the electric wires are exposed to a high temperature and to radioactive radiation which reduces the reliability.

It has been found, according to the invention, that said inconvenience can be eliminated by indicating the position by means of ultra-sound, by using a conductor for the ultra-sound, at least one device for shutting off the conductor so as to form a sound-reflecting bottom, and means on the object to be indicated for operating the shut-off device, the distance to the sound-reflecting bottom being measured by an ultrasonic transmitter-receiver situated at one end of the conductor. In a preferred embodiment of the invention the conductor for the ultra-sound consists of a tube which can be shut off at several places by plates which are moved into the tube by a permanent magnet provided on the control rod.

Figure 1:
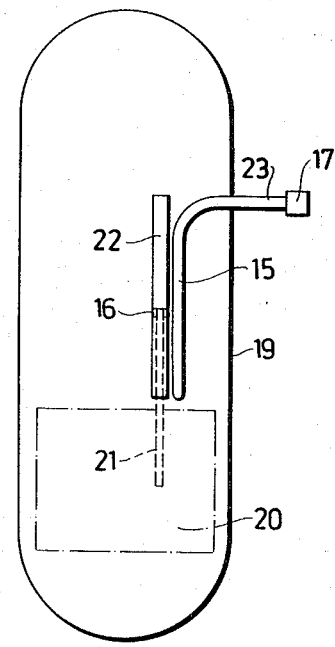
Figure 2:
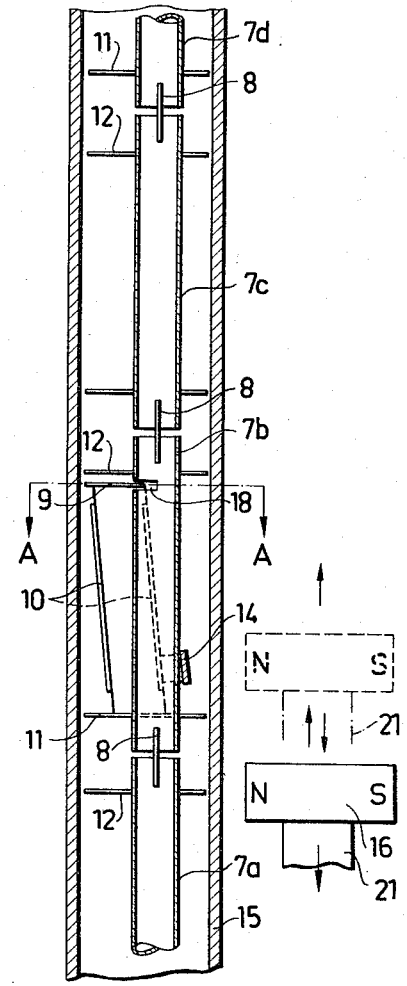
Figure 3:
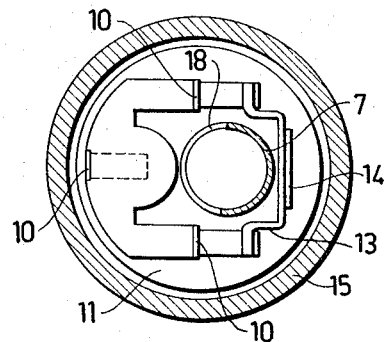

For illustrating the invention an embodiment thereof will be described below with reference to the accompanying drawing. FIG. 1 shows a reactor in which one control rod and one position indicator are illustrated. FIG. 2 illustrates on a larger scale a vertical cross-section of the position indicator of FIG. 1. FIG. 3 illustrates a horizontal cross-section along line A—A in FIG. 2.

FIG. 1 illustrates in a simplified way the reactor tank 19 of a nuclear reactor. The tank contains the reactor core 20 in which the nuclear fuel is situated. Rods 21 of a neutron-absorbing material can be lowered into the reactor core if it is desired to stop operation of the reactor. For the sake of clearness only one rod is shown, and for the same reason the means for operating the rod have been illustrated merely as a tube 22 or similar guide member. A tube 15 having a closed bottom extends parallel with the guide tube 22. Tube 15 consists of a non-magnetic material, for instance a non-magnetic stainless steel. The upper portion 23 of tube 15 is bent so as to extend horizontally through the tank wall, and supports on its outer end an ultrasonic transmitter-receiver 17.

As illustrated in FIG. 2 the tube 15 serves as a protective tube and contains an inner tube 7, which consists of several short parts 7a, 7b, 7c and 7d, united by leaf springs 8 to allow the composite tube to be bent. Owing to its flexibility the tube 7 can be inserted through the bent protective tube 15, 23. Spacing plates 11, 12 are arranged on each part of the tube 7 so as to fix its position in tube 15. Part 7b of tube 7 has a slit 18 extending approximately along half the circumference, see FIG. 3. In the slit thus produced a plate 9 can move in and out. When it is inserted it shuts off the interior of tube 7b entirely, thus producing a bottom in the tube 7. The plate 9 is fastened on three leaf springs 10 having their lower ends fastened to the spacing plate 11. In the normal position said leaf springs hold plate 9 outside tube 7. Two of the leaf springs 10 support also a number 13 which carries a plate 14 of a magnetic material.

A permanent magnet 16 is fastened to the top of the control rod 21. When, during the movement of the control rod, the magnet comes close to the plate 14, said plate 14 will be attracted so as to pull the plate 9 into the slit 18. When the magnet 16 has passed the plate 14 the plate 9 is returned to the normal position by the leaf springs 10.

The flexible tube 7 can contain any desired number of plates for shutting off the tube. Such plates can be provided in each separate part of the tube, or in every second part, for instance.

In order to find out which plate has been attracted by the magnet, i.e. the position of the magnet and, consequently, of the control rod, the ultrasonic transmitter-receiver 17 is used. This apparatus is constructed like an echo-sounder according to known principles. It transmits ultra-sound through the composite tube 7. This ultra-sound is reflected by the plate 9 that has entered a slit 18, and the apparatus can consequently measure the distance from the apparatus to said plate 9. The value given by the electronic portion of the echo-sounder can be presented in digital form, on a dial with a pointer, or on a recording instrument.

The illustrated embodiment can be modified and altered within the scope of the invention. For instance, the flexible tube 7 can be replaced by a straight, rigid tube, provided that the control rods are so arranged in the reactor that the tube can be inserted parallel with said rods into its position in the tank, and the magnet can be replaced by a device which actuates the shut-off device mechanically in the desired way.

What is claimed is:
1. A device for indicating the position of an object by ultra-sound comprising an inner tube adapted to serve as a conductor for the ultra-sound, a protective outer tube of non-magnetic material surrounding said inner tube, at least one spacing plate serving to position said inner tube relative to said protective outer tube, said inner tube having a slot in the wall thereof, a leaf spring supported by said spacing plate, a second plate supported by said spring adjacent to said slot, said second plate being movable magnetically into said slot and said spring being tensioned to move said second plate out of said slot and an ultrasonic transmitter-receiver positioned at an end of said inner tube for measuring the distance from said transmitter-receiver to a sound reflecting bottom in said inner tube.

2. A device as defined in claim 1 in which an iron core is attached to said spring.

3. A device for indicating the position of an object by ultra-sound comprising a conductor for the ultra-sound, at least one shut-off device for shutting off the conductor to form a sound-reflecting bottom therein, said shut-off device being actuatable magnetically, a permanent magnet on said object for actuating said shut-off device, springs supporting said shut-off device which return it to its non-actuated position after said magnet has been removed and an ultrasonic transmitter-receiver situated at one end of said conductor for measuring the distance therefrom to said sound reflecting bottom.

4. A device for indicating the position of an object by ultra-sound comprising a tube having a slot in its wall, a plate mounted to be moved into and out of said tube through said slot to form a sound-reflecting bottom therein, means on said object for moving said plate into said tube through said slot and an ultrasonic transmitter-receiver situated at one end of said tube for measuring the distance therefrom to said sound-reflecting bottom.

5. A device as claimed in claim 4, in which the plate is fastened to at least one leaf spring tensioned to maintain the plate in its non-actuated position outside the tube.

References Cited by the Examiner

UNITED STATES PATENTS

| | | | |
|---|---|---|---|
| 2,233,572 | 3/1941 | Atkins | 73—305 |
| 2,556,346 | 6/1951 | Stromberg | 73—313 |
| 2,713,263 | 7/1955 | Turner | 73—290 |
| 3,237,150 | 2/1966 | Beck et al. | 340—1 |

FOREIGN PATENTS

| | | |
|---|---|---|
| 1,126,419 | 7/1956 | France. |
| 1,329,765 | 5/1963 | France. |

CHESTER L. JUSTUS, *Primary Examiner.*

R. A. FARLEY, *Assistant Examiner.*